Figure 1:
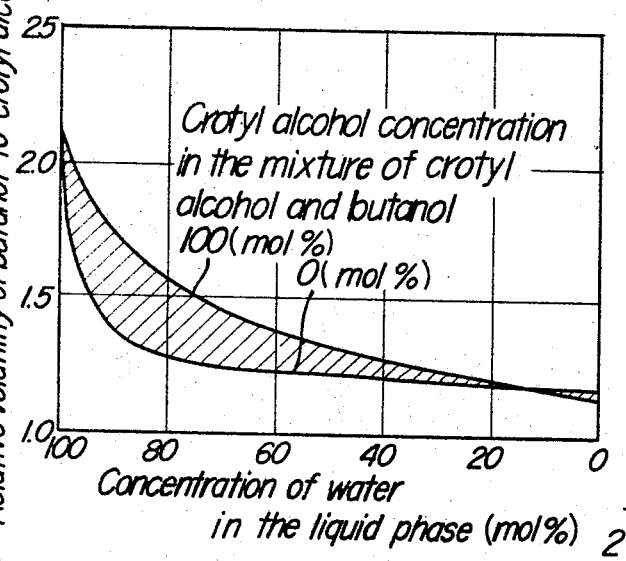

United States Patent Office 3,331,757
Patented July 18, 1967

3,331,757
DISTILLATION OF CROTYL ALCOHOL-BUTANOL MIXTURE WITH WATER ADDITION
Shiro Kudo, Seiichi Yada, Eiichi Fukasaku, Tatsuhito Seki, and Kiyoshi Fukui, all of Sakai-shi, Japan, assignors to Kyowa Hakko Kogyo Co., Ltd., Tokyo, Japan, a corporation of Japan
Filed Sept. 9, 1964, Ser. No. 395,213
Claims priority, application Japan, Mar. 14, 1964, 39/14,061
2 Claims. (Cl. 203—96)

This invention relates to a method of purifying crotyl alcohol. More particularly, the invention relates to a method for the manufacture of extremely pure crotyl alcohol by subjecting a mixture of crotyl alcohol and butanol to distillation, while employing water as a solvent or separating agent, as will hereinafter more clearly appear.

Crotyl alcohol forms two geometrical isomers, the one of the cis type and the other of the trans type. The boiling points of these two isomers and of butanol are shown in the following table:

TABLE

| Crotyl alcohol: | °C. |
|---|---|
| Cis type | 123.6 |
| Trans type | 121.2 |
| Butanol | 118 |

As is apparent from the table, the boiling points of cis and trans crotyl alcohol are both extremely close to that of butanol. Accordingly it is very difficult to separate crotyl alcohol and butanol from their mutual mixture by usual distillation. On the other hand, the existence of a small amount of by-product butanol in crotyl alcohol is inevitable when crotyl alcohol is produced from crotonaldehyde by catalytic hydrogenation or by reduction with lithium aluminum hydride. Moreover crotyl alcohol produced by these methods is predominantly of the trans type, and as apparent from the above-mentioned table trans type crotyl alcohol is more difficult to separate from butanol than is the cis type.

Crotyl alcohol has not, until recently, been of commercial importance, so that it has not been necessary to deal with the problem of the separation and purification thereof. However, the recent demand for crotyl alcohol on the market, and particularly in the fields of plastics, protective coatings, agriculture and drugs, has made it essential to resolve such problem.

It is, accordingly, an object of the present invention to provide a method for producing very pure crotyl alcohol from a mixture thereof with butanol.

This object is perfectly attained by the present method. In other words, the separation of crotyl alcohol in the very pure state from butanol is realized by the present invention, regardless of whether the crotyl alcohol is of the cis type or the trans type.

According to the present invention, a mixture of crotyl alcohol and butanol is fed to the intermediate part of a distillation column and the relative volatility of the butanol to the crotyl alcohol is varied by feeding water to a plate placed on the upper part of the feed plate of the mixture, whereby volatilized butanol is taken out from the top of the column and crotyl alcohol from which butanol is removed is discharged from the bottom of the column as an aqueous solution. In this instance, the water content in the internal liquid reflux below the water feeding plate must be maintained at an appropriate concentration.

Understanding of the theoretical aspect of the present invention will be facilitated by referring to the diagrams showing the relation between the composition and the relative volatility.

FIG. 1 is a diagram showing the effect of water concentration in the liquid phase upon the relative volatility of butanol to crotyl alcohol (cis-trans mixture, the concentration of cis type being approximately 13%). For the purpose of simplicity "the relative volatility of butanol to crotyl alcohol" will be abbreviated hereinafter simply to "the relative volatility." The two curves in the diagram show the relative volatilities regardless of the amount of water at the limiting value of crotyl alcohol concentration in the mixture with butanol. In other words, these curves show the relative volatilities at crotyl alcohol concentrations of 100 mol percent and 0 mol percent in the binary mixture of butanol and crotyl alcohol. Accordingly the hatched region between the two curves shows all the relative volatilities, when the concentration of water and the concentration of crotyl alcohol in a mixture of crotyl alcohol and butanol are varied. From FIG. 1 it is apparent that as the concentration of water increases the relative volatility increases and the separation of the two components becomes easier. The reason that the volatility of butanol increases faster than that of crotyl alcohol lies in the fact that the affinity of water to butanol is inferior to that to crotyl alcohol.

Figure 2:
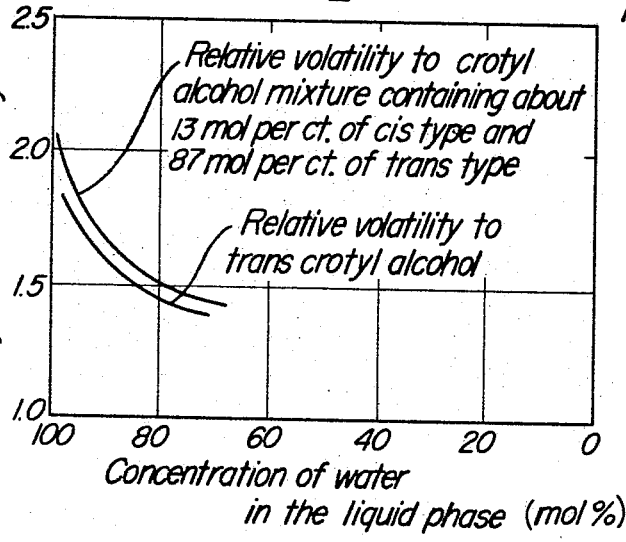

FIG. 2 is a diagram showing the variation of relative volatility due to the geometrical isomers of cis and trans. The two curves in this diagram are measured at the concentration of crotyl alcohol of 77 mol percent in the binary mixture of butanol and crotyl alcohol. As is apparent from this diagram, the relative volatility is smaller when crotyl alcohol in the mixture is of the trans type alone than when it is a mixture of trans type and cis type. This indicates that the relative volatility of trans type crotyl alcohol is smaller than that of the cis type.

In oreder to obtain pure crotyl alcohol which does not contain butanol from a mixture of crotyl alcohol and butanol, the concentration of water in the internal liquid reflux below the water feeding plate must be higher than 70 mol percent, preferably higher than 90 mol percent. This is perceived from the curves of FIG. 1 and FIG. 2.

Figure 3:
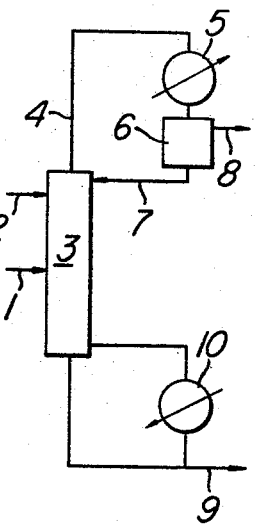

The practice of the present invention will be more fully understood by referring to FIG. 3 which diagrammatically shows a distillation apparatus for carrying out the process of the invention.

In FIG. 3, raw material, a mixture of crotyl alcohol and butanol is fed through pipe 1 to an appropriate plate of column 3. In order to maintain the water concentration of the internal liquid reflux below the water feeding plate at an appropriate value, water is fed to the column through pipe 2. The inlet of pipe 2 is located at the top or at a plate, situated several stages below the top. The vapor from the top of the distillation column 3 consists of butanol and water. It is condensed in a condenser 5 and then introduced in a separator 6. The upper layer separated at the separator, i.e. butanol which contains water in an amount corresponding to its solubility, is discharged out of the system through pipe 8. On the other hand, the lower layer and remaining part of the upper layer are returned to the distillation tower 3 as a reflux through pipe 7. The heat necessary to operate the tower 3 is supplied by heater 10. Crotyl alcohol from which butanol is eliminated, is withdrawn from the bottom through pipe 9 together with a large amount of water added as a separating agent.

When the bottom liquid of the distillation column, the aqueous crotyl alcohol solution, is dried by a suitable method, pure crotyl alcohol is obtained as the product. A drying method suitable for this purpose is, for example, as follows: Crotyl alcohol is taken out as an azeotropic mixture from the bottom liquid, and subjected to dehydrating distillation using a dehydrating agent such as benzene or the like, by which anhydrous crotyl alcohol is produced.

In order that those skilled in the art may more fully understand the nature of this invention and the method of carrying it out, the following illustrative, but non-limitative example is given.

EXAMPLE

A distillation column as shown in FIG. 3 made of copper having 70 plate stages and a diameter of 30 centimeters was used for purifying crotyl alcohol. A mixture of 91.7 weight percent of crotyl alcohol and 8.3 weight percent of butanol which had been preheated at a temperature of 90° C. in advance was fed through a pipe connected to the 40th plate from the top at a rate of 6.8 kilograms per hour. Water was fed through a pipe connected to the second plate at a rate of 65 kg./hour after being preheated at a temperature of 90°C. in advance. The reflux ratio at the top of the column was 26:1, leaving water out of consideration. The operation temperatures of the column were 93° C. at the top and 98° C. at the bottom respectively. A water-containing butanol was taken out of the top at a rate of 0.8 kg./hour and aqueous crotyl alcohol solution was withdrawn from the bottom at a rate of 71 kg./hour. Analytical data of the top and the bottom (at the standard which does not take water into consideration) were as follows:

Distillated from the top: Weight percent
Butanol _____ 99.3
Crotyl alcohol _____ 0.7

Withdrawn liquid from the bottom:
Crotyl alcohol _____ 99.8
Butanol _____ 0.2

During this operation the water concentration of the internal liquid reflux between the water feeding plate and the raw material feeding plate was maintained at about 95 mol percent while the water concentration of the internal liquid reflux below the raw material feeding plate was maintained at about 93 mol percent.

What is claimed is:
1. A method of separating crotyl alcohol and butanol from butanol-containing crotyl alcohol by extractive distillation, which comprises supplying the butanol-containing crotyl alcohol to an intermediate part of a distillation column, feeding water into the distillation column at a point above the point of supply of the butanol-containing crotyl alcohol, and maintaining the concentration of water in the internal liquid reflux below the water feeding point at more than 70 mol percent, whereby aqueous butanol is withdrawn from the top of said zone and aqueous crotyl alcohol is withdrawn from the bottom of the distillation column.

2. A method of separating crotyl alcohol and butanol from butanol-containing crotyl alchol by extractive distillation, which comprises supplying the butanol-containing crotyl alcohol to an intermediate part of a distillation column, feeding water into the distillation column at a point above the point of supply of the butanol-containing crotyl alcohol, and maintaining the concentration of water in the internal liquid reflux below the water feeding point at more than 90 mol percent, whereby aqueous butanol is withdrawn from the top of said zone and aqueous crotyl alcohol is withdrawn from the bottom of the distillation column.

References Cited

UNITED STATES PATENTS

| 1,724,761 | 8/1929 | Holden | 260—638 X |
| 2,663,679 | 12/1953 | Drout | 203—96 |
| 2,825,743 | 3/1958 | MacLean et al. | 260—638 X |
| 2,977,290 | 3/1961 | Molander | 203—95 |
| 3,230,156 | 1/1966 | Katzen | 260—643 |
| 3,284,517 | 11/1966 | Rylander et al. | 260—638 |

FOREIGN PATENTS 1,152,393  8/1963  Germany.

NORMAN YUDKOFF, *Primary Examiner.*

F. E. DRUMMOND, *Assistant Examiner.*